United States Patent [19]
Sasaki et al.

[11] Patent Number: 5,768,967
[45] Date of Patent: Jun. 23, 1998

[54] SLIDE BAR MOUNTING MECHANISM IN SLIDE-TYPE CIRCULAR SAW AND METHOD OF MOUNTING SLIDE BARS

[75] Inventors: Katsuhiko Sasaki; Kouji Matsubara, both of Anjo; Masahiro Sato, Aichi-ken, all of Japan

[73] Assignee: Makita Corporation, Aichi-ken, Japan

[21] Appl. No.: 663,983

[22] Filed: Jun. 14, 1996

[30] Foreign Application Priority Data

Jun. 15, 1995 [JP] Japan ................................. 7-149050

[51] Int. Cl.⁶ ................................................ B27B 5/18
[52] U.S. Cl. ...................... 83/471.3; 83/486.1; 83/490; 83/581; 29/434
[58] Field of Search ................ 83/468.3, 471.2, 83/471.3, 477.1, 485, 486, 486.1, 487, 490, 581; 29/434

[56] References Cited

U.S. PATENT DOCUMENTS

| | | | |
|---|---|---|---|
| 2,627,880 | 2/1953 | Johnson | 83/486.1 X |
| 2,656,860 | 10/1953 | Thayer | 83/468.3 |
| 2,903,026 | 9/1959 | Frydenlund | 83/468.3 |
| 4,163,404 | 8/1979 | Lavis | 83/486.1 X |
| 4,537,105 | 8/1985 | Bergler | 83/486.1 X |
| 4,587,875 | 5/1986 | Deley | 83/471.3 |
| 4,869,142 | 9/1989 | Sato et al. | 83/471.3 X |
| 4,995,288 | 2/1991 | DellaPolla | 83/471.3 X |
| 5,054,352 | 10/1991 | Fushiya et al. | 83/471.3 X |
| 5,060,548 | 10/1991 | Sato et al. | 83/471.3 |
| 5,146,825 | 9/1992 | Dehari | 83/486.1 X |
| 5,207,141 | 5/1993 | Dehari | 83/486.1 X |
| 5,241,888 | 9/1993 | Chen | 83/471.3 |
| 5,421,228 | 6/1995 | Fukinuki | 83/486.1 X |

FOREIGN PATENT DOCUMENTS

| | | | |
|---|---|---|---|
| 407205 | 1/1991 | European Pat. Off. | 83/581 |
| 1264550 | 5/1961 | France | 83/490 |

*Primary Examiner*—Clark F. Dexter
*Attorney, Agent, or Firm*—Dennison, Meserole, Pollack & Scheiner

[57] ABSTRACT

A slide-type circular saw includes a turntable rotatable relative to a base, and includes a saw unit having a saw blade mounted thereon. The saw unit is slidably movable relative to the turntable by a plurality of slide bars extending in parallel with each other. A slide bar mounting mechanism includes a first mounting mechanism for fixedly mounting the saw unit to the slide bars and a second mounting mechanism for slidably mounting the slide bars on the turntable. One of the first and second mounting mechanisms is non-adjustable with respect to the positional relationship between the slide bars, while the other is adjustable with respect to the positional relationship between the slide bars.

10 Claims, 7 Drawing Sheets

SLIDE BAR MOUNTING MECHANISM IN SLIDE-TYPE CIRCULAR SAW AND METHOD OF MOUNTING SLIDE BARS

FIELD OF THE INVENTION

The present invention relates to a slide bar mounting mechanism in a slide-type circular saw and a method of mounting slide bars on the circular saw.

DESCRIPTION OF THE PRIOR ART

U.S. Pat. Nos. 4,869,142 and 5,060,548 disclose a slide-type circular saw shown in FIG. 7 which corresponds to FIG. 6 in these patents. A turntable 4 is rotatably mounted on an upper surface of a base 1. A holder 7 is mounted on a rear portion of the turntable 4 and supports a pair of slide bars 11 such that the slide bars 11 are slidable in parallel relationship with each other. A saw unit 13 is mounted on front ends of the slide bars 11 by means of a saw unit holder 9. A support member 10 is mounted on rear ends of the slide bars 11 for preventing removal of the slide bars 11. With this construction, since the saw unit 13 is slidable relative to the turntable 4 in both forward and rearward directions, a work having a greater width can be completely cut without causing short of cut and without changing the setting position of the work on the base 1.

In order to ensure the smooth slide movement of the circular saw 13, the parallel relationship between the slide bars 11 must be reliably held over the entire slidable range of the slide bars 11. Thus, with the conventional construction, through holes 7a formed in the holder 7 for inserting the slide bars 11, fitting holes 9a formed in the saw unit holder 9 for press fitting of the front ends of the slide bars 11, and fitting holes 10a formed in the support member 10 for press fitting of the rear ends of the slide bars 11 shown in FIG. 8 must be machined highly accurately to ensure the parallel relationship between the slide bars 11. In addition, a distance L0 between the axes of the through holes 7a, a distance L1 between the axes of the fitting holes 9a and a distance L2 between the axes of the fitting holes 10a must be accurately in conformity to each other.

With the conventional construction, since both ends of each slide bar 11 are fitted into the fitting holes 9a and 10a by press fitting without play in the diametrical direction of each slide bar 11, the adjustment to position the slide bars 11 in parallel relationship with each other is substantially impossible when the slide bars 11 are assembled. Therefore, each pair of the through holes 7a, the fitting holes 9a and the fitting holes 10a must be accurately machined to ensure the parallel relationship with each other and to ensure the equidistant relationship among the distances L0, L1 and L2.

Thus, the conventional construction involves the problem that the machining operation of parts of the circular saw is troublesome and that the manufacturing costs are increased. In addition, if the parts have not been machined to a required accuracy, such parts cannot be used to manufacture a circular saw and must be discarded. This may also increase the manufacturing costs.

SUMMARY OF THE INVENTION

It is, accordingly, an object of the present invention to provide a slide bar mounting mechanism in a slide-type circular saw which enables the slide bars to be mounted on the circular saw with the slide bars accurately positioned in parallel with each other.

It is another object of the present invention to provide a method of mounting slide bars on a slide-type circular saw which enables the slide bars to be mounted on the circular saw with the slide bars accurately positioned in parallel with each other.

According to a first aspect of the present invention, there is provided a slide bar mounting mechanism in a slide-type circular saw having a turntable rotatable relative to a base, a saw unit having a saw blade mounted thereon, the saw unit being slidably movable relative to the turntable by means of a plurality of slide bars extending in parallel with each other, comprising:

a first mounting mechanism for fixedly mounting the saw unit on the slide bars; and a second mounting mechanism for slidably mounting the slide bars on the turntable;

one of the first and second mounting mechanisms being non-adjustable with respect to the positional relationship between the slide bars, while the other being adjustable with respect to the positional relationship between the slide bars.

According to a second aspect of the present invention, there is provided a slide bar mounting mechanism in a slide-type circular saw having a turntable rotatable relative to a base, a saw unit having a saw blade mounted thereon, the saw unit being slidably movable relative to the turntable by means of a plurality of slide bars extending in parallel with each other, comprising:

a first mounting mechanism including a plurality of first mounting portions for fixedly mounting the slide bars on the saw unit, respectively; and a second mounting mechanism including a plurality of second mounting portions for slidably mounting the slide bars on the turntable, respectively;

at least one of the first and second mounting portions being adjustable with respect to the mounting positions of their corresponding slide bars.

According to a third aspect of the present invention, there is provided a method of mounting a plurality of slide bars on a slide-type circular saw having a turntable rotatable relative to a base, a saw unit having a saw blade mounted thereon, the saw unit being slidably movable relative to the turntable by means of a plurality of slide bars extending in parallel with each other, comprising the steps of:

a) fixing the slide bars in position relative to each other by means of one of a first mounting mechanism and a second mounting mechanism, the first mounting mechanism being adapted to mount the slide bars on the saw unit, and the second mounting mechanism being adapted to mount the slide bars on the turntable;

b) determining the position of the other of the first and second mounting mechanisms based on the position of the slide bars fixed by the step a); and c) fixing the position of the other of the first and second mounting mechanisms.

The invention will become more apparent from the following detailed description thereof.

DETAILED DESCRIPTION OF THE PREFERRED EMBODIMENT

An embodiment of the present invention will now be explained with reference to the drawings.

Figure 1:
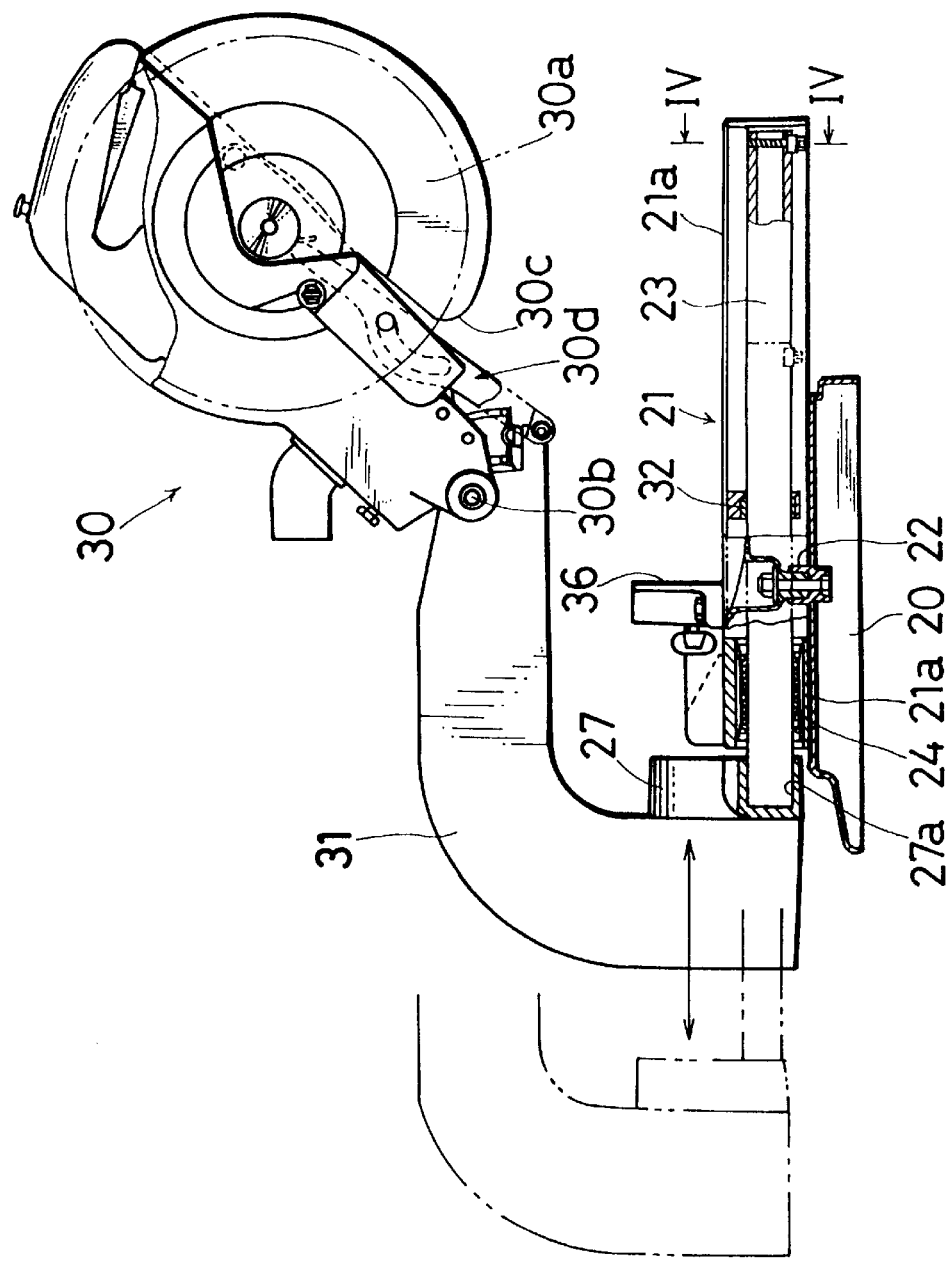
FIG. 1 is a side view, with a part broken away, of a slide-type circular saw incorporating a slide bar mounting mechanism according to an embodiment of the present invention.

Referring to FIG. 1, there is shown a slide-type circular saw incorporating a slide bar mounting mechanism according to the embodiment. A base 20 has an upper surface on which a turntable 21 is mounted. The turntable 21 is rotatable within a horizontal plane about a support portion 22 of the base 20 by a predetermined angular range.

Figure 2:
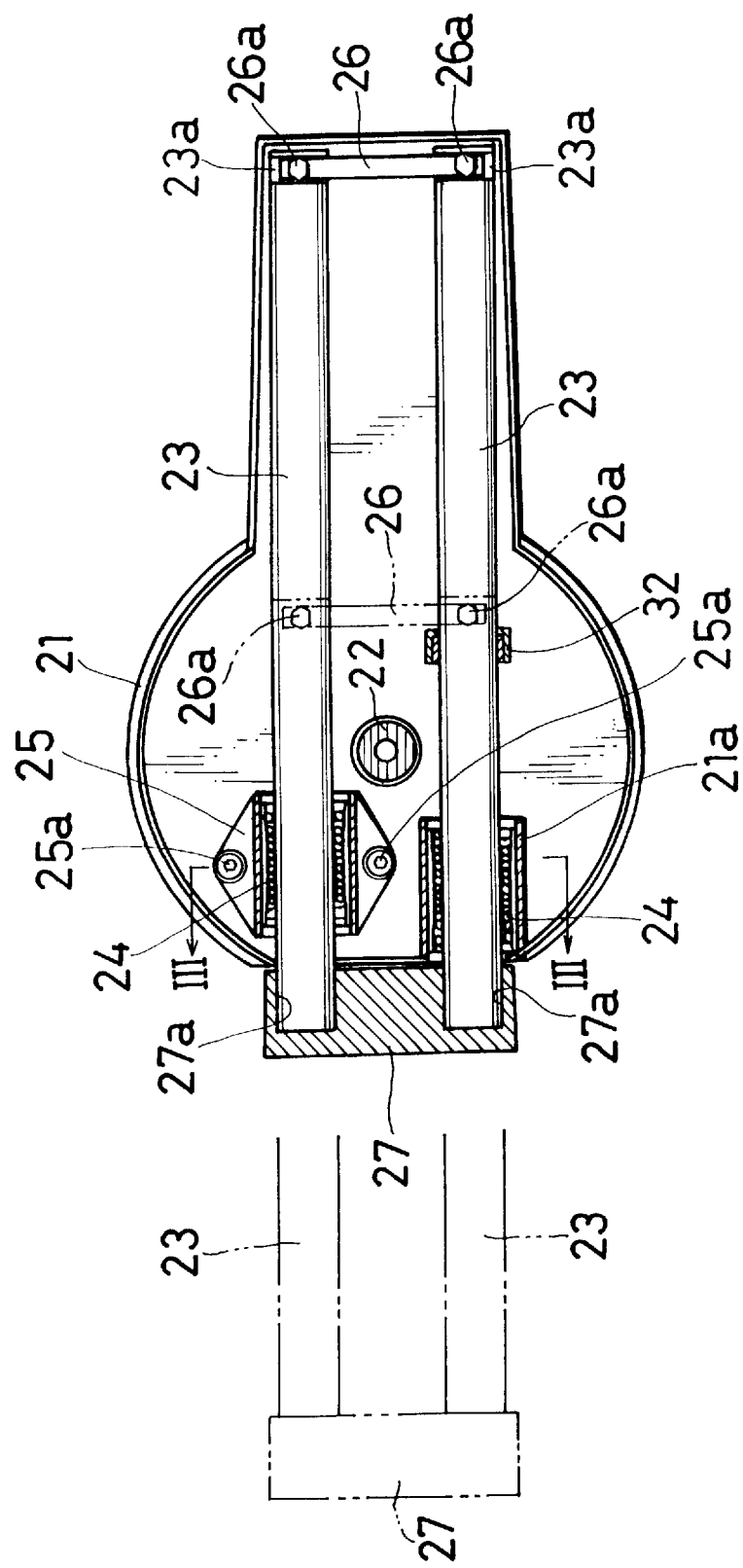
FIG. 2 is a bottom view of a turntable of the slide-type circular saw.
Figure 3:
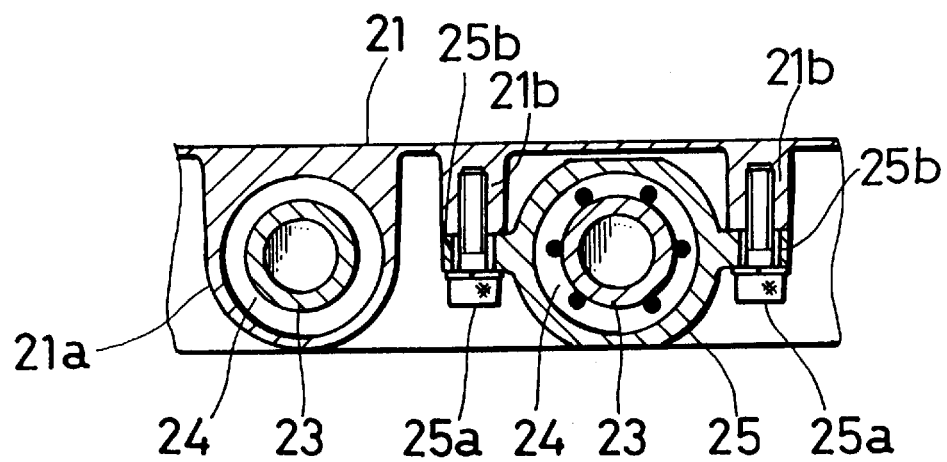
FIG. 3 is a sectional view taken along line III—III in FIG. 2.

As shown in FIGS. 2 and 3, a pair of slide bars 23 are disposed below an upper surface of the turntable 21 and are supported by the slide bar mounting mechanism in such a manner that the slide bars 23 are positioned in parallel with each other and that the slide bars 23 are slidable in right and left directions as viewed in FIG. 2 (in a direction perpendicular to the sheet showing FIG. 3). In this embodiment, the mounting mechanism comprises mainly of a pair of linear ball bearings 24. One of the linear ball bearings 24 positioned on the lower side as viewed in FIG. 2 (left side as viewed in FIG. 3) is mounted within a substantially cylindrical holder 21a which is formed integrally with a lower surface of the turntable 21. On the other hand, the other linear ball bearing 24 positioned on the upper side as viewed in FIG. 2 is mounted within a holder 25 which is a separate member from the turntable 21. The holder 25 is secured to the lower surface of the turntable 21 by means of a pair of bolts 25a which are inserted into their corresponding insertion holes 25b formed in the holder 25 and which are in engagement with mounting portions 21b formed integrally with the lower surface of the turntable 21. The diameter of the insertion holes 25b is greater than the diameter of shanks of the bolts 25a, so that the horizontal position of the holder 25 can be adjusted by loosening the bolts 25a.

Figure 4:
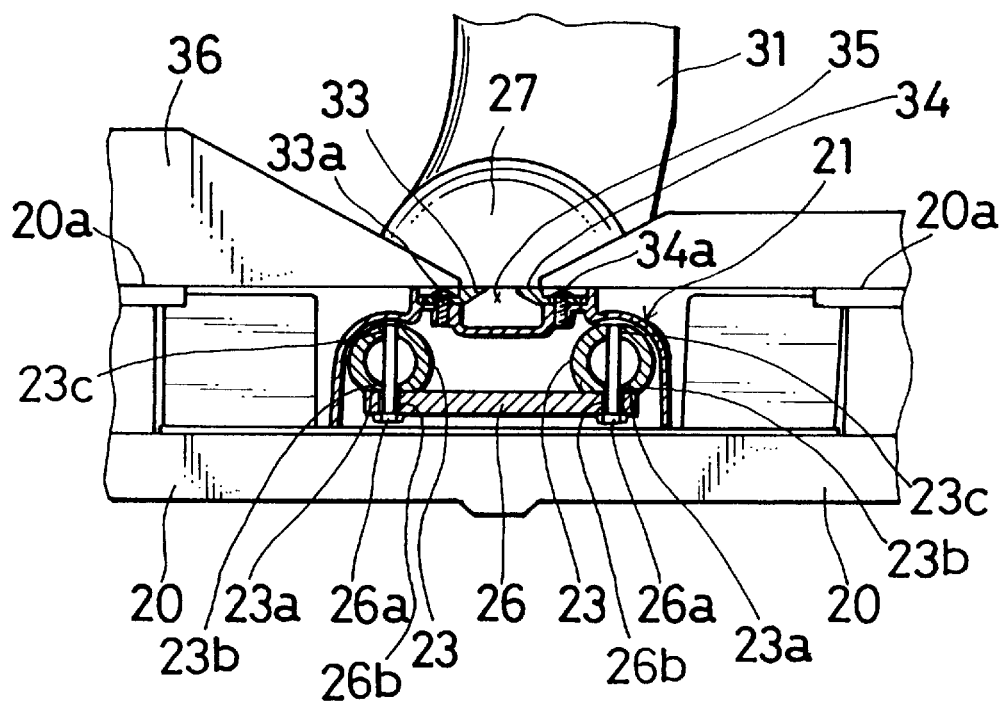
FIG. 4 is a sectional view taken along line IV—IV in FIG. 1.

As shown in FIGS. 2 and 4, each of the slide bars 23 has a front end (a right end as viewed in FIG. 2) having a flat surface 23a formed on the lower side thereof. A connecting plate 26 serves to prevent the slide bars 23 from removal from the turntable 21 when the slide bars 23 are slidably moved relative to the turntable 21. The connecting plate 26 is disposed to extend between the flat surfaces 23a of the slide bars 23 and is secured to the slide bars 23 by means of bolts 26a. As shown in FIG. 4, each of the bolts 26a has a shank inserted into an insertion hole 26b formed in the connecting plate 26 and extends through the corresponding slide bar 23 in a diametrical direction. Each of the slide bars 23 has a through hole 23b open at the flat surface 23a and a threaded hole 23c formed in a position diametrically opposed to each other. Thus, the shank of the bolt 26a extends through the through hole 23b and is threadably engaged with the threaded hole 23c. Here, the diameter of the insertion hole 26b is greater than the diameter of the shank of the bolt 26a while the diameter of the through hole 23b is substantially the same as the diameter of the shank of the bolt 26a. Therefore, a fine adjustment of the distance between the slide bars 23 or a degree of parallelization therebetween can be performed by loosening one of the bolts 26a.

A support block 27 serves as a support for a circular saw unit 30 and is mounted on and between rear ends (left ends as viewed in FIG. 2) of the slide bars 23. As shown in FIG. 1, a support arm 31 having a substantially inverted L-shaped configuration is mounted on a rear surface of the support block 27. The circular saw unit 30 is mounted on one end of the support arm 31 and is positioned above the turntable 21. The circular saw unit 30 is vertically pivotable about a fulcrum point 30b relative to the support arm 31. The circular saw unit 30 is provided with a circular saw blade 30a which is rotatably driven by a motor (not shown). A safety cover 30c is provided for normally covering substantially the lower half of the saw blade 30a. The safety cover 30c is moved to uncover the lower half of the saw blade 30a by means of a link mechanism 30d in response to the downward vertical movement of the circular saw unit 30.

In this embodiment, the support arm 31 is pivotable laterally relative to the support block 27 for performing an oblique cutting operation.

A pair of fitting holes 27a for press fitting of the slide bars 23 are formed in the support block 27. The fitting holes 27a have closed bottoms and are open at a front surface (a right side surface as viewed in FIG. 1) of the support block 27. The central axes of the fitting holes 27a are spaced from each other by a predetermined distance (a distance corresponding to L2 in the conventional construction). The diameter of each of the fitting holes 27a is determined to be appropriate for press fitting of the corresponding slide bar 23. In addition, the fitting holes 27a are machined highly accurately to provide a great degree of parallelization, so that the slide bars 23 are highly accurately positioned in parallel with each other when they are fitted into their corresponding fitting holes 27a. However, the distance between the axes of the fitting holes 27a are not required to be accurately determined.

With the slide bar mounting mechanism of this embodiment, the slide bars 23 are supported at three positions in their axial direction by the support block 27, the linear ball bearings 24 and the connecting plate 26 and are held in parallel relationship with each other.

Here, a dust seal 32 is mounted on the lower surface of the turntable 21 and slidably receives the slide bars 23 as shown in FIGS. 1 and 2. A fence 36 is provided for determining the position of a work placed on the base 20. The fence 36 is mounted on and between both side portions of the base 20 to extend over the rear portion of the turntable 21. The turntable 21 has an extension 21a extending radially outwardly therefrom. A pair of plates 33 and 34 are mounted on the turntable 21 to extend from substantially the center of the turntable 21 to the outer end of the extension 21a. The plates 33 and 34 cooperate to form a blade insertion slot 35 therebetween for receiving a lower part of the saw blade 30a. The plates 33 and 34 are fixed in position relative to the extension 21a by means of screws 33a and 34a, respectively, so that the width of the insertion slot 35 as well as the position of the insertion slot 35 in the widthwise direction can be adjusted.

A method of mounting the slide bars 23 on the turntable 21 will now be explained.

First, the rear ends of the slide bars 23 are fitted into their corresponding fitting holes 27a of the support block 27 by press fitting. Since the fitting holes 27a are machined to provide a great degree of parallelization as described above, the rear ends of the slide bars 23 are reliably positioned in parallel relationship with each other.

Then, the front ends of the slide bars 23 are inserted into their corresponding linear ball bearings 24, and the slide bars 23 are further moved axially relative to the linear ball bearings 24 to a position where the support block 27 is positioned adjacent the linear ball bearings 24 as indicated by solid lines in FIG. 2. In this stage, however, the bolts 25a are loosened to permit movement of the holder 25 in the direction parallel to the turntable 21. Therefore, the position of the holder 25 is determined according to the position of the corresponding slide bar 23. As the result, by means of the slide bars 23, the linear ball bearings 24 are highly accurately positioned in parallel relationship with each other to correspond to the parallel relationship between the fitting holes 27a, and the distance between the axes of the linear ball bearings 24 is brought to substantially conform to the distance between the axes of the fitting holes 27a. With the position of the holder 25 thus determined, the bolts 25a are tightened to secure the holder 25 in position.

Subsequently, the connecting plate 26 is attached to and between the lower sides of the front ends of the slide bars 23. In this stage, the bolts 26a are loosened to permit the connecting plate 26 to be moved on and along the flat surfaces 23a of the slide bars 23. Then, the slide bars 23 are moved relative to the linear guide bearings 24 in the opposite direction (left direction as viewed in FIG. 2) to a position where the connecting plate 26 is positioned toward the linear ball bearings 24 as shown by chain lines in FIG. 2. With this operation, the front ends of the slide bars 23 are positioned highly accurately in parallel relationship with each other, and the distance between the axes of the front ends is brought to reliably conform to the distance between the axes of the linear ball bearings 24. With the front ends of the slide bars 23 thus positioned, the bolts 26a are tightened to secure the connection plate 26 to the slide bars 23. Consequently, a great degree of parallelization as with the linear ball bearings 24 and the fitting holes 27a of the support block 27 can be obtained between the front portions of the slide bars 23. Further, the distance between the axes of the front portions of the slide bars 23 is brought to conform to the distance between the axes of the linear ball bearings 24 as well as the distance between the fitting holes 27a.

As described above, by mounting the slide bars 23 on the turntable 21 with their positions determined based on the positions of the fitting holes 27a, the degree of parallelization as well as the distance of axes between the slide bars is translated substantially exactly into the linear ball bearings 24 and into the connecting plate 26. Therefore, the parallel relationship between the slide bars 23 is reliably maintained over the entire range of movement of the slide bars 23. This means that the slide bars 23 are slidably supported by the linear ball bearings 24 which are secured in position such that the distance between the axes of the slide bars 23 accurately conforms to the distance between the fitting holes 27a.

Therefore, an accurate machining work is required only for the fitting holes 27a of the support block 27, and the holder 25 and the holder 21a, and the connecting plate 26 are not required to be machined with a great accuracy as required for the fitting holes 27a. Particularly, with regard to the distance between the axes, the fitting holes 27a as well as the linear ball bearings 24 are not required to be highly accurately determined. To this end, it is not required to accurately machine the parts such as the holder 25 and the holder 21a which are required to be machined accurately in the conventional construction. Therefore, the troublesome machining operation can be eliminated, so that the manufacturing costs can be reduced. In addition, wastes to be discarded due to the improper machining operation can be considerably reduced.

Although in the above embodiment, two slide bars 23 are provided, it will be apparent that the same support mechanism can be applied to a circular saw having three or more slide bars.

Figure 5:
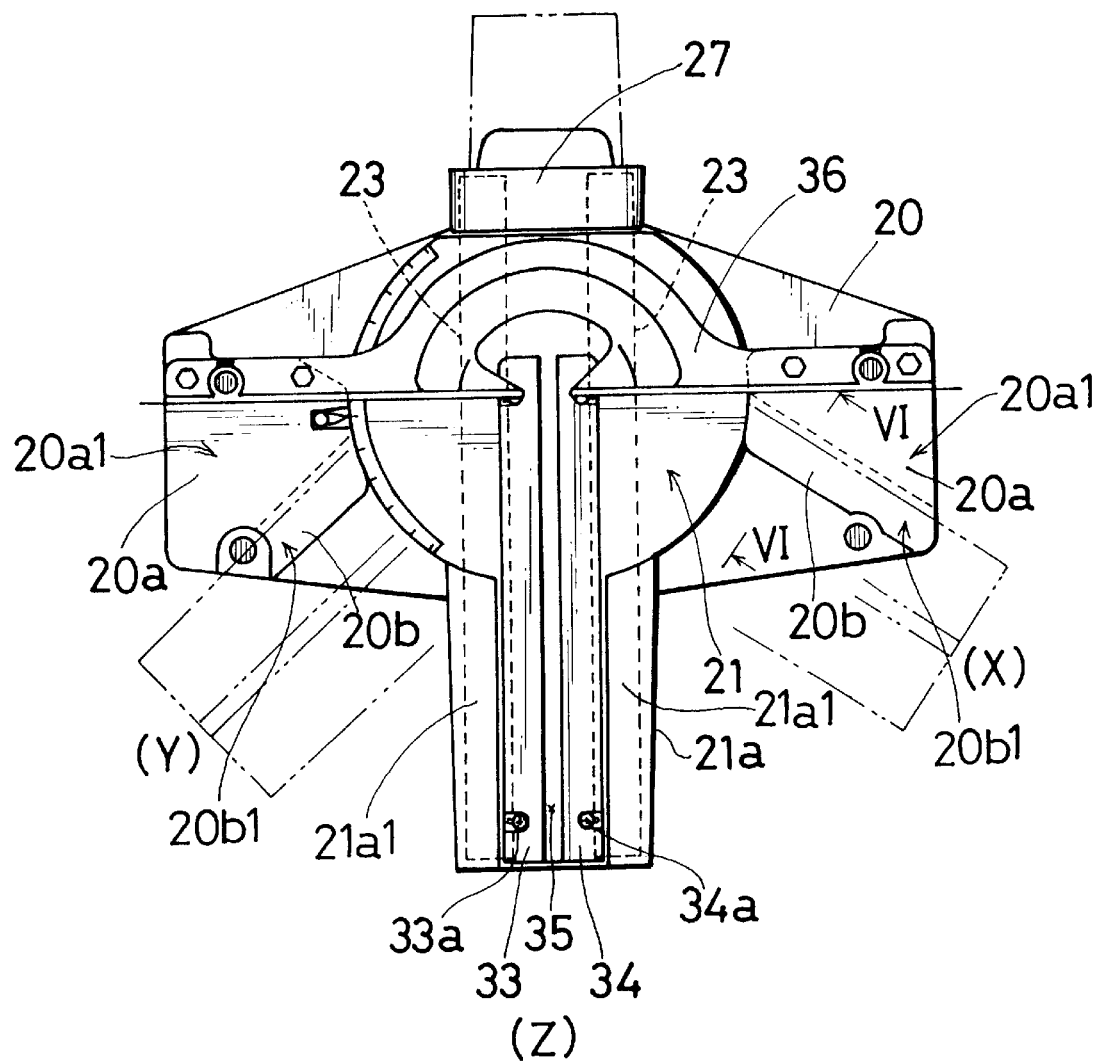
FIG. 5 is a plan view of the turntable and a base on which the turntable is mounted.

Meanwhile, as described previously, the turntable 21 can be rotated within a predetermined angular range about the support portion 22. Therefore, a cutting operation with the cutting slot 35 inclined relative to the saw blade 30a can be performed. As shown in FIG. 5, the turntable 21 is rotatable between a position X and a position Y indicated by chain lines. The turntable 21 in a middle position Z between the positions X and Y is shown by solid lines, and in this position, the saw blade 30a is positioned perpendicular to the longitudinal axis of the work, so that a normal vertical cutting operation can be performed.

When the turntable 21 is rotated to bring the saw blade 30a in a position inclined relative to the longitudinal axis of the work, an inclined cutting operation can be performed. A larger inclined angle can be obtained as the rotational range of the turntable 12 increases. However, the base 20 includes work support portions 20a formed on both sides thereof for placing the work thereon. Therefore, in order to increase the rotational range of the turntable 12, the area of each of work support surfaces 20a1 formed on the work support portions 20a must be decreased. Therefore, conventionally, the rotational range of the turntable 12 is determined to a possible greater range which ensures necessary and sufficient areas of the work support surfaces 20a1 of the base 20.

Figure 6:
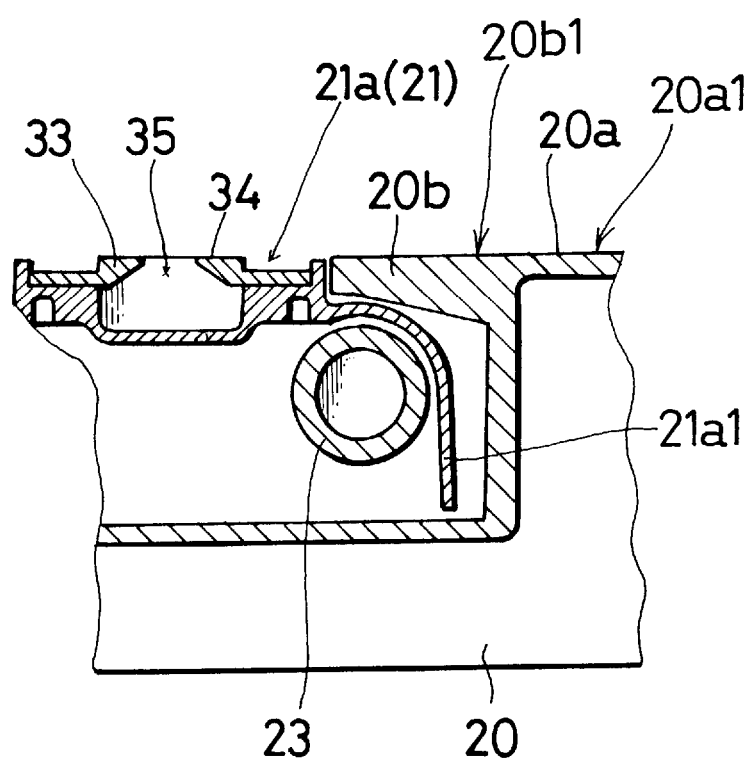
FIG. 6 is a sectional view taken along line VI—VI in FIG. 5.
Figure 7:
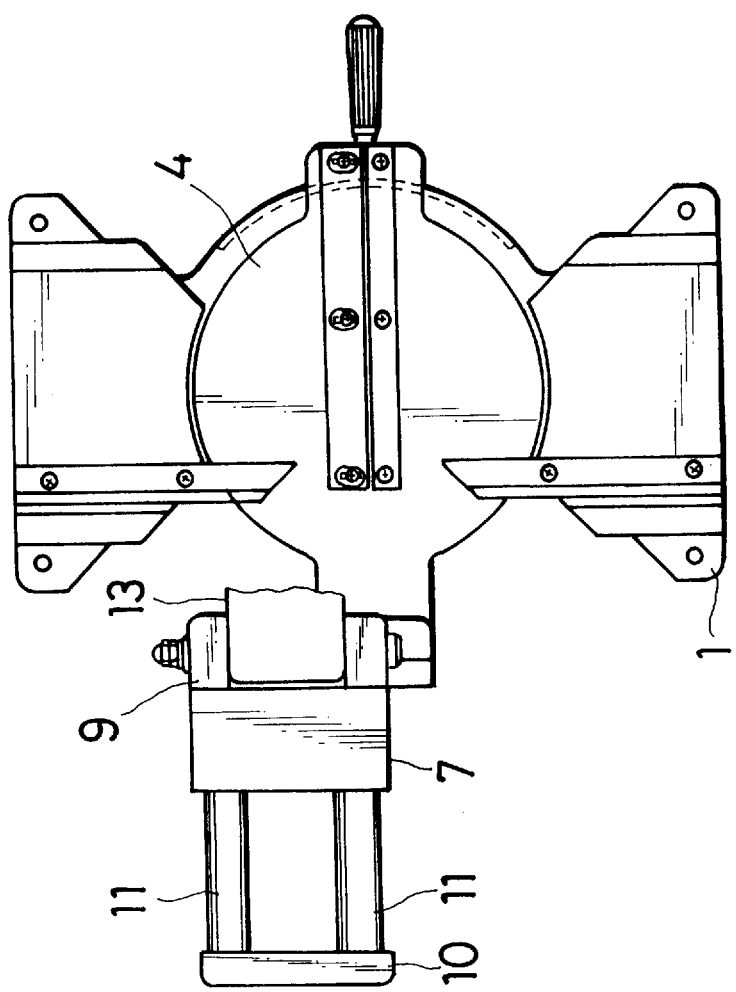
FIG. 7 is a plan view of a slide-type circular saw incorporating a conventional slide bar mounting mechanism.
Figure 8:
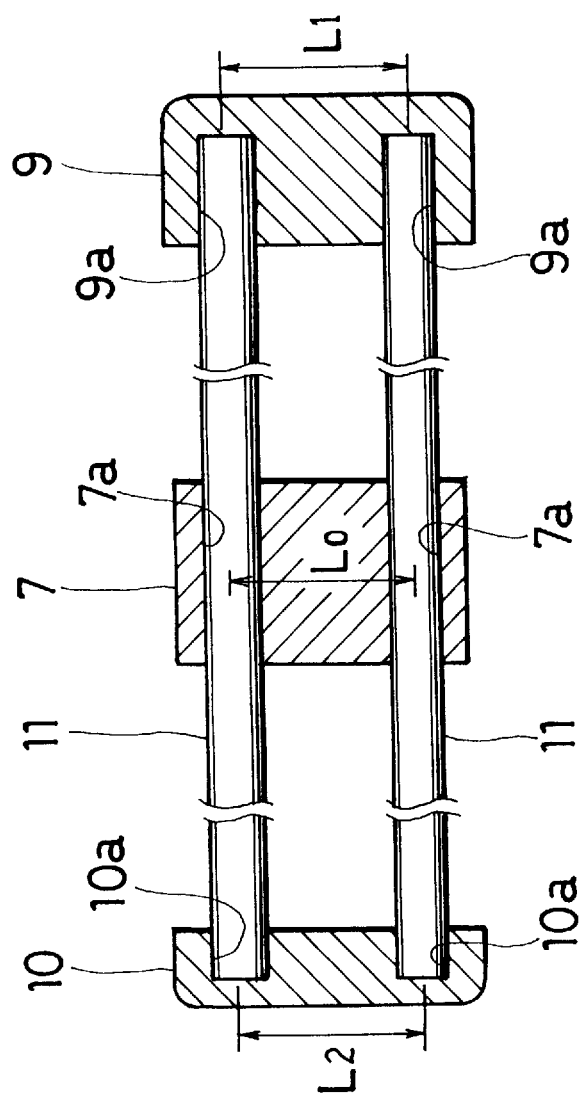
FIG. 8 is a schematic view of the conventional slide bar mounting mechanism.

In view of this fact, as shown in FIG. 6, the extension 21a of the turntable 21 has both lateral side portions 21a1 (one shown in FIG. 6) which extend laterally outwardly from positions adjacent and lower than the plates 34 and 35, respectively. Each of the lateral side portions 21a1 has a configuration curved downwardly in the outward direction. On the other hand, a pair of support extensions 20b are formed integrally with the base 20 to provide additional support surfaces 20b1 which are continuous and flush with their corresponding work support surfaces 20a1. Each of the support extensions 20b extends from the support portion 20a toward the extension 21a in the rotational direction of the turntable 21.

With this construction, when the extension 21a is rotated to a position adjacent each support portion 20a, the support extension 20b extends above the lateral side portion 21a1 of the extension 21a, so that the front end of the support extension 20b is positioned adjacent the plate 33 or plate 34 as shown in FIG. 6.

Thus, the area for supporting the work can be increased by the additional support surfaces 20a1 without narrowing the rotational range of the extension 21a or the turntable 21.

Although in the above embodiment, the slide bar mounting mechanism is adapted to the slide-type circular saw in which the slide bars 23 are positioned below the upper surface of the turntable 21, the same mechanism can be adapted to a slide-type circular saw having slide bars disposed above the upper surface of a turntable.

Additionally, although in the above embodiment, the slide bars 23 are non-adjustably fixed to the support block 27 which supports the saw unit 30 and are adjustably fixed to the turntable 21 with respect to the positional relationship with each other by means of the bearings 24, the bearings 24 may be non-adjustably fixed to the turntable 21 with respect to the positional relationship with each other, and the slide bars 23 may be adjustably fixed to the support block 27. Thus, the positions of the slide bars 23 relative to the saw unit 30 may be determined based on the positions of the slide bars 23 relative to the turntable 21.

While the invention has been described with reference to a preferred embodiment thereof, it is to be understood that modifications or variations may be easily made without departing from the spirit of this invention which is defined by the appended claims.

What is claimed is:

1. A circular saw comprising:

a turntable rotatably mounted to a base;

a saw unit having a saw blade mounted thereon, the saw unit being slidably mounted to the turntable by a plurality of slide bars extending in a substantially longitudinal direction;

first mounting means for mounting the saw unit on the slide bars for slidable movement of the saw unit together with the slide bars; and second mounting means for slidably mounting the slide bars on the turntable for movement of the saw unit and the slide bars relative to the turntable;

one of said first and second mounting means being non-adjustable for fixedly positioning portions of said slide bars against movement relative to each other and spacing said portions of said slide bars a fixed distance from one another, and the other of said first and second mounting means being laterally adjustable for adjusting the distance between other portions of said slide bars to correspond to said fixed distance and bring said slide bars into parallel with each other.

2. The circular saw as defined in claim 1 wherein said first mounting means is non-adjustable, and wherein said second mounting means is laterally adjustable.

3. The circular saw as defined in claim 2 wherein said second mounting means includes a plurality of mounting members slidably supporting the slide bars, respectively, one of said mounting members being non-adjustably fixed in position on the turntable, and another of said mounting members being adjustably fixed in position on the turntable.

4. The circular saw as defined in claim 3 wherein each of said mounting members of said second mounting means include bearings which axially slidably receive a respective one of the slide bars.

5. The circular saw as defined in claim 2 wherein said first mounting means includes a support member on which the saw unit is mounted, and a plurality of fitting holes formed in the support member, the slide bars being fitted into said fitting holes by press fitting.

6. The circular saw as defined in claim 1 further including connecting means for connecting other portions of the slide bars to each other, said connecting means being laterally adjustable to accommodate the adjustment between the slide bars.

7. The circular saw as defined in claim 6 wherein said first mounting means is non-adjustable and fixes first ends of the slide bars in position relative to each other, and wherein said connecting means includes a connecting plate extending between second ends of the slide bars, and each of the slide bars is adjustably mounted to said connecting plate by of fasteners.

8. A circular saw comprising:

a turntable rotatably mounted to a base;

a saw unit having a saw blade mounted thereon, the saw unit being slidably mounted to the turntable by a plurality of slide bars extending in a substantially longitudinal direction;

first mounting means, including a plurality of first mounting portions, for mounting the slide bars to the saw unit for movement of the saw unit together with the slide bars; and second mounting means, including a plurality of second mounting portions, for slidably mounting the slide bars on the turntable for movement of the slide bars and the saw unit relative to the turntable;

at least one of said plurality of first and second mounting portions being laterally adjustably mounted to the saw unit and the turntable, respectively, to adjust portions of said slide bars with respect to each other and to bring the slide bars into parallel relative to each other.

9. A method of mounting a plurality of slide bars on a circular saw having a turntable rotatably mounted to a base, a saw unit having a saw blade mounted thereon, the saw unit being mounted to the turntable by said plurality of slide bars and being slidably movable relative to the turntable by said plurality of slide bars which extend in a substantially longitudinal direction, first mounting means for mounting the slide bars to the saw unit for movement therewith, and second mounting means for slidably mounting the slide bars on the turntable, the second mounting means being laterally adjustable on the turntable, the method comprising the steps of:

a) fixing portions of the slide bars in a position relative to each other by said first mounting means;

b) laterally adjusting said second mounting means to adjust other portions of said slide bars relative to each other to correspond to the relative position of said portions of the slide bars fixed by the first mounting means and to bring said slide bars substantially into parallel with each other, said second mounting means being laterally adjusted by slidably moving the slide bars with respect to said second mounting means such that said first mounting means moves towards said second mounting means; and c) fixing the position of said second mounting means on the turntable;

wherein said second mounting means includes a plurality of bearings receiving and axially slidably supporting the slide bars, and said step of slidably positioning the slide bars comprises axially sliding said slide bars relative to said bearings, a first one of said bearings being fixed in position relative to the turntable, and a second one of said bearings adjustably moving relative to said first one of said bearings to adjust said position of said second mounting means.

10. A method of mounting a plurality of slide bars on a circular saw having a turntable rotatable mounted to a base and a saw unit having a saw blade mounted thereon, the saw unit being mounted to the turntable by said plurality of slide bars and being slidably movable relative to the turntable by said plurality of slide bars which extend in a substantially longitudinal direction, first mounting means for mounting the slide bars to the saw unit for movement therewith, second mounting means for slidably mounting the slide bars on the turntable, and connecting means for adjustably connecting the slide bars to each other, the second mounting means and said connecting means each being laterally adjustable, the method comprising the steps of:

fixing first ends of the slide bars in a position relative to each other by said first mounting means;

adjustably connecting second ends of the slide bars with each other by said connecting means such that the second ends of slide bars are laterally adjustable relative to each other;

laterally adjusting said second ends of said slide bars with respect to each other in said connecting means to correspond to the relative position of said first ends fixed by said first mounting means and to bring said slide bars substantially into parallel with each other, said second ends being laterally adjusted by axially slidably moving the slide bars with respect to said second mounting means and said turntable to bring said connecting means toward said first mounting means so as to determine the positions of the second ends; and fixing the positions of the second ends of the slide bars relative to each other in said connecting means.

* * * * *

UNITED STATES PATENT AND TRADEMARK OFFICE
CERTIFICATE OF CORRECTION

PATENT NO. : 5,768,967
DATED : June 23, 1998
INVENTOR(S) : Katsuhiko SASAKI ET AL It is certified that error appears in the above-indentified patent and that said Letters Patent is hereby corrected as shown below:

Column 7, line 62, delete "of".

Signed and Sealed this

Eighth Day of September, 1998

*Attest:*

BRUCE LEHMAN

*Attesting Officer*     *Commissioner of Patents and Trademarks*